Sept. 22, 1970          H. C. APPELO ET AL          3,530,503
           SOLID STATE CHOPPER FOR CONTROLLING LOAD CURRENT
                     Filed June 26, 1966

WITNESSES:
Bernard R. Giequay
E. Strickland

INVENTORS
Hendrik C. Appelo and
Brian R. Slattery.
BY
ATTORNEY

United States Patent Office 3,530,503
Patented Sept. 22, 1970

3,530,503
SOLID STATE CHOPPER FOR CONTROLLING LOAD CURRENT
Hendrik C. Appelo, Monroeville, and Brian R. Slattery, Turtle Creek, Pa., assignors to Westinghouse Electric Corporation, Pittsburgh, Pa., a corporation of Pennsylvania
Filed June 26, 1968, Ser. No. 740,183
Int. Cl. H02p 5/16
U.S. Cl. 318—301                                 7 Claims

ABSTRACT OF THE DISCLOSURE

A solid state or static chopper circuit for a traction motor in which a commutating capacitor is connected between the cathodes of main and turn-off thyristors and to ground by a simple resistor to maintain a reverse or turn-off charge on said capacitor during extended "on" times of the main thyristor.

BACKGROUND OF THE INVENTION

The present invention relates to a control circuit for direct current traction motors such as employed for the propulsion of rapid transit vehicles in automatic train control systems, and particularly to a solid state chopper circuit in which the charge on a commutating capacitor is maintained regardless of the length of time a main switching device is in an on or conducting state.

Conventionally used direct current chopper circuits generally employ a main thyristor or semiconducting switching device for controlling and conducting the flow of total motor current, with a commutating capacitor and a turn-off thyristor serially connected across the main thyristor. An oppositely poled diode or auxiliary thyristor and a reactor are connected in a loop circuit with the capacitor.

In operation, the chopper circuit is set for operation initially firing the turn-off thyristor to turn it on. This permits a current to flow to charge the capacitor from the direct current source or line, and when the capacitor is charged the current goes to zero and the thyistor turns off. The chopper circuit is then ready for operation and is turned on by firing of the main thyristor and the auxiliary transistor (if used). This permits current flow through the main thyristor to the motors and at the same time completes an oscillatory circuit through the reactor and the auxiliary thyristor to the capacitor thereby charging the capacitor with a reverse voltage, the diode or auxiliary thyristor allowing current flow in only one (i.e., reverse) direction. This current then ceases to flow and the auxiliary thyristor is turned off, the main thyristor being in an on or conductive condition with current flowing therethrough and through the motors to ground. To turn the chopper circuit off, the turn-off thyristor is fired which completes a circuit from the capacitor to the main thyristor to apply the reverse voltage of the capacitor to the main thyristor to turn it off. The amount of current supplied to the motor is determined by the durations of the on and off times of the main and turn-off thyristors which are governed by the frequency of the firing pulses applied to the gates of the main and turn-off thyristors. The chopper circuit may turn on and off in direct response to motor current to maintain a desired average motor current, for example, as shown and described in copending application 711,109 filed Mar. 6, 1968 by John M. Mills and assigned to the present assignee.

With this typical chopper circuit, the commutating capacitor has a tendency to discharge (by virtue of leakage current flow through the auxiliary and turn-off thyristors) during extended "on" times of the main thyristor so that when the turn-off thyristor is fired, little or no reverse polarity potential is available to turn off the main thyristor. To correct this tendency, the turn-off thyristor of the typical chopper circuit must be frequently pulsed, each pulse turning on the turn-off thyristor which of course turns off the main thyristor, the capacitor not having had time to lose its reverse charge.

A typical direct current chopper circuit is shown in the copending Mills application. United States patents showing basic conventional direct current chopper circuits include 3,242,352 issued to B. E. Long, 3,222,582 issued to H. W. Heyman et al. and 3,325,714 issued to Y. Torii.

BRIEF SUMMARY OF THE INVENTION

Broadly, the present invention provides a chopper circuit in which it is not necessary to pulse the turn-off thyristor in order to maintain a charge on the commutating capacitor and thus insure the availability of a reverse potential for turning off the main thyristor and thus the chopper circuit. More specifically, in the present disclosure, the commutating capacitor and a resistor are serially connected across the motor, the capacitor simply exchanging positions with the turn-off thyristor and reactor circuit. When the reverse voltage is developed across the capacitor with the firing of the main and auxiliary thyristors, the magnitude of the charge on the capacitor remains substantially constant and essentially equal to that of the supply voltage. The resistor provides a path to ground for leakage current flow through the auxiliary and turn-on thyristors thereby preventing the leakage current flow through the capacitor in a discharging direction. In this manner a turn-off charge is maintained on the commutating capacitor during the time the main thyristor is conducting and the auxiliary thyristor is non-conducting. When the turn-off thyristor is fired, the capacitor discharges to apply a reverse voltage to the main thyristor, the magnitude of said reverse voltage being essentially double that of the supply voltage; the main thyristor is thereby turned off and the chopper circuit again readied for operation.

THE DRAWINGS

The invention, along with the objects and advantages thereof, will be best understood from the following detailed description taken in connection with the accompanying drawings in which.

PREFERRED EMBODIMENT

Figure 1:
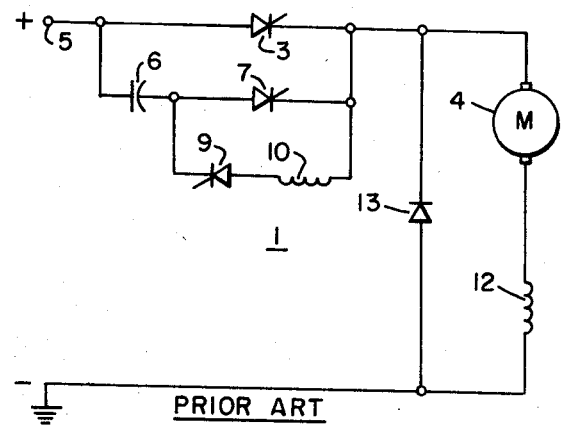
FIG. 1 shows a basic, conventional direct current chopper circuit.

In FIG. 1 there is shown a typical known direct current chopper circuit 1 in which a main thyristor 3 is connected between a source of direct current (not shown) and a motor (or motors) 4 to handle and control the total flow of motor current. The direct current voltage is applied between a terminal 5 and ground; the terminal 5 may be or include a device for collecting current from a trolley, for example. A commutating capacitor 6 and a second thyristor 7 are serially connected across the thyristor 3, the thyristor 7 being poled in the manner shown for turning off the thyristor 3 when 7 is fired. An oppositely poled thyristor 9, or other suitable rectifier or diode device, and a reactor 10 are serially connected across the thyristor 7 to form an oscillator circuit with the capacitor 6 when the thyristors 3 and 9 are fired. The thyristor 9 may be replaced with an ordinary diode such as shown in the above cited Long and Torii patents.

A reactor means 12 is serially connected in the motor circuit for smoothing motor current, and a free wheeling diode 13 is connected across the motor and reactor, as shown, to provide a closed loop circuit or path for inductive decay currents generated in the armature and field windings of the motor when the chopper 1 is turned off.

In operation of the chopper 1, the thyristor 7 is initially fired or turned on by application of a suitable pulse to its gate terminal which causes power current to flow through the commutating capacitor 6 to charge the same. When the capacitor is fully charged, current flow falls to zero and the thyristor 7 turns off.

To turn the chopper 1 on, the thyristors 3 and 9 are simultaneously fired, the thyristor 3, now in an on condition, conducting full load current to the motor 4. The thyristor 9 conducts to charge the capacitor 6 in the opposite or reverse direction, the capacitor discharging through 3, 10 and 9 to recharge in the reverse direction. Since the side of capacitor connected to the terminal 5 cannot be negative with respect to the terminal (the two being directly connected together), the other side of the capacitor assumes a voltage level essentially double that of the direct current source with the reverse charging of the capacitor. The reverse charging current then ceases to flow and the thyristor 9 turns off. This double voltage level remains as long as the main thyristor is on.

To turn the chopper 1 off, the thyristor 7 is fired which applies the reverse voltage on the capacitor 6 to the cathode of the main thyristor 3 thereby turning the main thyristor off. The capacitor then charges from the line or source as previously described, the charging current flowing through the thyristor 7 until the capacitor is charged. The current flow then goes to zero and the thyristor 7 turns off.

It will be apparent that this entire on-off operation of the chopper circuit 1 takes place very rapidly, in a few microseconds, the chopper controlling the amount of current supplied to the motor 4 in dependence upon firing signals applied to the gate terminals of the thyristors 3, 7 and 9, for example, as shown in the above-mentioned copending Mills application.

When the main thyristor 3 is conducting, the voltage on the cathode of the thyristor 7 and the anode of the thyristor 9 (i.e., the motor side of the thyristors) will be essentially that of the positive potential of the direct current source or supply. While the main thyristor 3 conducts and the thyristors 7 and 9 are off, the capacitor 6 tends to discharge. This is caused by leakage current flow through the thyristors 7 and 9 and thus through the capacitor in a discharging direction, namely, in the direction of the motor 4. If the main thyristor is on long enough, the reverse or turn-off charge on the capacitor decreases to a level that is inadequate to turn off the main thyristor 3 when the thyristor 7 is fired. For this reason, it has been necessary to frequently pulse the turn-off thyristor 7 in order to maintain a charge on the capacitor 6 so that the main thyristor 3 can always be turned off. When the main thyristor is turned off, it is again turned on simultaneously with the thyristor 9, the thyristor 9 reestablishing the reverse charge on the capacitor.

Figure 2:
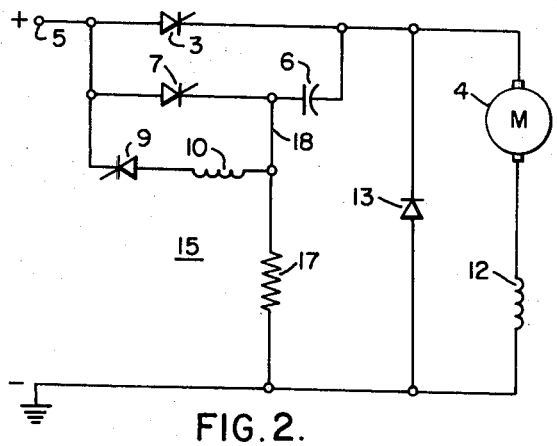
FIG. 2 shows a chopper circuit constructed in accordance with the principles of the present invention.

In accordance with the present invention, FIG. 2 shows a chopper circuit 15 in which it is not necessary to pulse the turn-off thyristor to maintain a reverse or turn-off charge on the commutating capacitor. For simplicity of illustration, like numerals designate like components in the circuits depicted in FIGS. 1 and 2.

Thus, as shown in FIG. 2, the components 6, 9 and 10 are rearranged so that the capacitor 6 is connected between the cathodes of the thyristors 3 and 7, and a resistor 17 is added between ground and a connection 18 joining the capacitor with the thyristor 7 and the reactor 10. The remainder of the chopper circuit 15 is essentially the same as that of the prior chopper circuit 1 of FIG. 1.

In operation of the novel circuit 15, the thyristor 7 is initially fired, as in the chopper circuit of FIG. 1, which completes a circuit for the flow of power current through the capacitor to charge the same.

To turn the chopper 15 on, the thyristors 3 and 9 are fired, the thyristors completing a circuit for discharging the capacitor 6 and recharging it in a reverse direction. At the time thyristors 3 and 9 are fired and some time thereafter, the capacitor voltage appears in reverse direction across the thyristor 7, thereby turning it off. When the capacitor is charged, the reverse current flow falls to zero and the thyristor 9 turns off. The current leakage through the thyristors 7 and 9 will now be to ground through the resistor 17, the charge on the capacitor remaining substantially constant during the entire and extended on times of the main thyristor 3.

When the thyristor 7 is fired to turn off the circuit 15, the charge potential on the capacitor 6 is applied to the cathode of the main thyristor 3 along with the positive potential of the direct current source (at the terminal 5) through the thyristor 7. In this manner a double potential is momentarily applied to the cathode of the main thyristor without the necessity of its continuous existence as in the case with the conventional circuit of FIG. 1.

Thus, the novel circuit of FIG. 2 has a double advantage, namely, the maintenance of the turn-off charge on the capacitor 6 with extended on periods of the main thyristor 3, and a high (double) turn-on voltage only when the thyristor 7 is fired.

It should now be apparent from the foregoing description that a new and useful chopper circuit has been disclosed in which a reverse or turn-off charge is maintained on a commutating capacitor regardless of the length of the "on" time of a main switching device (thyristor 3). This has been accomplished by simply exchanging the positions of the capacitor and a turn-off switching device (thyristor 7) and a reactor circuit so that the capacitor can be connected between ground and the thyristors by a simple resistor. The resistor provides a path for leakage current to flow to ground instead of through the capacitor in a discharging manner, and thus maintains a reverse charge on the capacitor, the magnitude of the charge being essentially that of the direct current source.

Though the invention has been described with a certain degree of particularity, is should be understood that the disclosure herein presented has been made by way of example only and that changes may be made therein without departing from the spirit and scope thereof.

We claim as our invention:

1. A control system for a direct current motor comprising:
    a main semiconducting switching device connected between said motor and a given polarity output terminal of a direct current power source to control motor current,
    an oscillator circuit including a symmetrically conductive current path, a capacitor, a reactor and a rectifier device serially connected together across said main switching device, said rectifier device connected to have a polarity opposite to that of the main switching device, said rectifier device being in the circuit on one side of said capacitor, said symetrically conductive current path extending from the opposite side of the capacitor to the main switching device,
    a second semiconducting switching device connected across said reactor and said rectifier device, and connected to have the same polarity as that of the main switching device, and
    resistance means connected between the opposite polarity output terminal of said power source and said oscillator circuit at a point between the capacitor and said second switching device, said resistance means being effective to maintain a charge on the capacitor when said main switching device is conducting and said rectifier device is not conducting.

2. The circuit described in claim 1 in which the rectifier device is a third semiconducting switching device.

3. The circuit described in claim 1 in which the capacitor is connected between the cathodes of the first and second switching devices.

4. The circuit described in claim 1 in which the motor is a traction motor for propelling a transit vehicle.

5. In a load current control system wherein a load is supplied with power from a direct current power source through a pair of opposite polarity supply lines connected between the power source and the load, a chopper circuit comprising:

- a first semiconducting switching device connected in series in one of said supply lines;
- a second semiconducting switching device, a capacitor and a symmetrically conductive current path serially connected across said first switching device, said second switching device being connected to have the same polarity as said first switching device, the second switching device being connected to one side of the capacitor, said symmetrically conductive current path extending from the other side of the capacitor to the first switching device;
- a reactor and a rectifier serially connected across said second switching device, said rectifier connected to have a polarity opposite to that of said switching devices; and
- resistance means connected between the other of said supply lines and the connection between said capacitor and said second switching device,
- said resistance being effective to maintain a charge on the capacitor when said first switching device is conducting and said rectifier is not conducting.

6. The circuit described in claim 5 in which the rectifier is a third semiconducting switching device.

7. The circuit described in claim 5 in which the capacitor is connected between the cathodes of the first and second switching devices.

References Cited

UNITED STATES PATENTS

| 3,242,352 | 3/1966 | Long | 307—240 |
| 3,344,328 | 9/1967 | Morris | 318—269 X |

FOREIGN PATENTS

| 1,114,425 | 5/1968 | Great Britain. |

ORIS L. RADER, Primary Examiner

R. J. HICKEY, Assistant Examiner

U.S. Cl. X.R.

307—240